(12) United States Patent
Zhang

(10) Patent No.: US 8,958,431 B2
(45) Date of Patent: Feb. 17, 2015

(54) ACCESS METHOD AND APPARATUS FOR MULTI-PROTOCOL LABEL SWITCHING LAYER 2 VIRTUAL PRIVATE NETWORK

(75) Inventor: Junhui Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 342 days.

(21) Appl. No.: 13/583,627

(22) PCT Filed: Mar. 14, 2011

(86) PCT No.: PCT/CN2011/071780
§ 371 (c)(1),
(2), (4) Date: Sep. 8, 2012

(87) PCT Pub. No.: WO2011/113340
PCT Pub. Date: Sep. 22, 2011

(65) Prior Publication Data
US 2012/0327944 A1    Dec. 27, 2012

(30) Foreign Application Priority Data

Mar. 16, 2010    (CN) .......................... 2010 1 0138528

(51) Int. Cl.
| H04L 12/28 | (2006.01) |
|---|---|
| H04L 12/701 | (2013.01) |
| H04L 12/723 | (2013.01) |
| H04L 12/46 | (2006.01) |

(52) U.S. Cl.
CPC ................. *H04L 45/00* (2013.01); *H04L 45/50* (2013.01); *H04L 2012/4629* (2013.01)
USPC ......... 370/401; 370/254; 370/392; 370/395.5

(58) Field of Classification Search
None
See application file for complete search history.

(56) References Cited

U.S. PATENT DOCUMENTS 7,260,097 B2 *  8/2007  Casey ........................... 370/392
7,974,223 B2 *  7/2011  Zelig et al. .................... 370/258
(Continued)

FOREIGN PATENT DOCUMENTS

| CN | 101022392 A | 8/2007 |
|---|---|---|
| CN | 101447906 A | 6/2009 |
| CN | 101808042 A | 8/2010 |
| EP | 1713197 A1 | 10/2006 |

OTHER PUBLICATIONS

Supplementary European Search Report in European application No. 11755657.1, mailed on Mar. 6, 2014.
(Continued)

*Primary Examiner* — Hassan Phillips
*Assistant Examiner* — Hicham Foud
(74) *Attorney, Agent, or Firm* — Oppedahl Patent Law Firm LLC

(57) ABSTRACT

An access method and apparatus for a MPLS L2VPN are described. The method includes that a customer side and a network side sends their respective message to an operator routing equipment, set the access types of the messages to be mapped to virtual ports, and respectively allocate their respective Source Virtual Ports (SVP) and Destination Virtual Ports (DVP) to each access, and establish a data forwarding channel of the MPLS L2VPN by respectively establishing connection from their own SVP to the DVP of the opposite side. With the disclosure, various access modes are uniformly mapped to virtual ports, and then the MPLS L2VPN is accessed; furthermore, forwarding can be performed based on a Virtual Switch Interface (VSI) and virtual ports.

16 Claims, 3 Drawing Sheets

(56) References Cited

U.S. PATENT DOCUMENTS

| | | | |
|---|---|---|---|
| 8,625,412 B2* | 1/2014 | Voit et al. | 370/225 |
| 2004/0049542 A1 | 3/2004 | Ould-Brahim | |
| 2007/0008982 A1* | 1/2007 | Voit et al. | 370/401 |
| 2007/0115913 A1 | 5/2007 | Li | |
| 2007/0147400 A1* | 6/2007 | Hu | 370/401 |
| 2007/0268915 A1* | 11/2007 | Zelig et al. | 370/401 |
| 2008/0205404 A1* | 8/2008 | Wen et al. | 370/392 |
| 2009/0327797 A1* | 12/2009 | Wei | 714/2 |
| 2010/0158010 A1* | 6/2010 | Kang et al. | 370/392 |
| 2012/0201127 A1* | 8/2012 | Voit et al. | 370/225 |

OTHER PUBLICATIONS

Kamite et al, Network Working Group, Framework and Requirements for Virtual Private multicast Service (VPMS), Oct. 26, 2009, See Supplementary European Search Report.

International Search Report in international application No. PCT/CN2011/071780, mailed on Jun. 16, 2011.

English Translation of the Written Opinion of the International Search Authority in international application No. PCT/CN2011/071780, mailed on Jun. 16, 2011.

* cited by examiner

Prior art

ACCESS METHOD AND APPARATUS FOR MULTI-PROTOCOL LABEL SWITCHING LAYER 2 VIRTUAL PRIVATE NETWORK

TECHNICAL FIELD

The disclosure relates to the field of network inter internetworking, in particular to an access method and apparatus for a Multi-protocol Label Switching Layer 2 Virtual Private Network (MPLS L2VPN).

BACKGROUND

With the rapid development of Internet, for meeting requirements of different customers and different types of service traffic for accessing an IP network, different networking technologies are required to be adopted; at present, the Ethernet is applied widely, and it belongs to a local area network technology; however, branches of many large enterprises are distributed in different places, therefore it is needed to adopt a network technology to connect them with each other and ensure a certain degree of privacy. At present, an MPLS L2VPN is adopted universally to achieve that purpose, as is shown in FIG. 1. A communication process of a message sent by a Customer Edge 1 (CE1) in an MPLS L2VPN is given below as an example for illustration.

With reference to FIG. 1, message transmission from CE1 to CE2 needs to traverse the MPLS L2VPN; and the message transmission needs the following three steps: 1, a customer layer 2 Ethernet message is made to access a Provider Edge 1 (PE1) and forwarded to a Provider (P) device; 2, a Multi-protocol Label Switching (MPLS) message is forwarded to the PE1 through the intermediate P device; 3, the MPLS message is ended at a PE2 and forwarded to the CE2.

Step 1 is a forwarding process of making an Ethernet message of the CE1 access the PE1; first, it is required to establish a Virtual Switch Interface (VSI) on the PE1; a customer message accesses the VSI through a port, a Virtual Local Area Network (VLAN) or QinQ; an source Medium Access Control (MAC) address is learned at the port or in the VLAN; then, an MAC address table is looked up according to a destination MAC address, and an output port and a VLAN of the destination MAC address are checked; after an output port of the next hop is found, a Virtual Circuit (VC) label, a tunnel label and layer 3 link information are encapsulated and forwarded to the P device;

Step 2 is a forwarding process of the MPLS message in the P device; the P device only performs label switching on the MPLS message, namely, only modifying the outmost message header and tunnel label, while the VC label and an inner customer message are kept unchanged; if the P device is a Penultimate Hop Popping (PHP) node, the outer tunnel label pops up;

Step 3 is a forwarding process of ending the MPLS message at the PE2 and forwarding it to the CE2; supposing that the tunnel label pops up at the P device, the MPLS message is forwarded at the PE2 to a corresponding VSI according to the VC label; the VC label is detached, and the source MAC address of the customer message is learned to find a VC interface; then, the output port and VLAN are found according to a destination MAC address of the inner customer message, and the MPLS message is forwarded to the corresponding CE2.

In the above process that an Ethernet customer message of a CE traverses the MPLS L2VPN, there are many modes of making the customer message access the VSI, is such as through a Port, or a VLAN, or QinQ, or a Port and a VLAN, or a Port and QinQ, and the modes can also an MPLS access mode. Because there are a variety of access types of a L2VPN, it is needed to look for different interface types during MAC address learning and forwarding, which results in the complexity of implementing the L2VPN on the PE and poor extensibility of accessing, and decreases the system reliability.

SUMMARY

On that account, the technical problem to be solved by the disclosure is to provide an access method and apparatus for an MPLS L2VPN, which solve the problem in the current mode of directly accessing an L2VPN that the extensibility of accessing is poor and equipment is complex by uniformly mapping various access types of customer messages to a virtual port, and then accessing an MPLS L2VPN through the virtual port.

For solving above technical problem, the following technical solutions are provided.

An access method for an MPLS L2VPN is provided, which includes: making, by a customer side and a network side, their respective messages access operator routing equipment, setting access types of the messages to be mapped to virtual ports, and respectively allocating their respective Source Virtual Ports (SVP) and Destination Virtual Ports (DVP) to each access; and establishing, by the customer side and the network side, a data forwarding channel of the MPLS L2VPN by establishing connection from their respective SVPs to DVPs of opposite sides.

The establishing, by the customer side and the network side, a data forwarding channel of the MPLS L2VPN by establishing connection from their respective SVPs to DVPs of opposite sides may include: when the customer side and the network side determine that the MPLS L2VPN accessed through the virtual ports is a Virtual Private Wire Service (VPWS) network, establishing, by the customer side and the network side, a data forwarding channel of the VPWS network by establishing connection from their respective SVPs to the DVPs of the opposite sides.

The establishing, by the customer side and the network side, a data forwarding channel of the MPLS L2VPN by establishing connection from their respective SVPs to DVPs of opposite sides may include: when the customer side and the network side determine that the MPLS L2VPN accessed through the virtual ports is a Virtual Private LAN Service (VPLS) network, establishing a Virtual Switch Interface (VSI), associating the virtual ports of the customer side and the network side with the VSI, and establishing, is by the customer side and the network side, a data forwarding channel of the VPLS network by establishing connection from their respective SVPs to the DVPs of the opposite sides.

The access type of the message of the customer side may be Port, or VLAN, or QinQ, or Port and VLAN, or Port and QinQ, or VLAN and QinQ; and the access type of the message of the network side may be Label or Port.

The SVP may be used for receiving the messages, and the DVP may be used for sending the messages.

An access apparatus for an MPLS L2VPN is provided, which includes a control module and a connection establishing module, wherein the control module is configured to respectively make a message of a customer side and a message of a network side access operator routing equipment, set access types of the messages to be mapped to virtual ports, allocate respective SVPs and DVPs of the customer side and the network side to each access, and send information of the virtual ports after allocation to the connection establishing module; and the connection establishing module is configured to establish a data forwarding channel of the MPLS L2VPN by respectively establishing connection from the SVP of the customer side to the DVP of the network side and connection from the SVP of the network side to the DVP of the customer side, according to the information of the virtual ports after allocation which is sent by the control module.

The connection establishing module is configured to establish a data forwarding channel of the MPLS L2VPN by respectively establishing connection from the SVP of the customer side to the DVP of the network side and the connection from the SVP of the network side to the DVP of the customer side, which may refer to that: when the connection establishing module determines that the MPLS L2VPN accessed by the customer side and the network side through the virtual ports is a VPWS network, the customer side and the network side establish a data forwarding channel of the VPWS network by establishing connection from their respective SVPs to the DVPs of opposite sides.

The connection establishing module is configured to establish a data forwarding channel of the MPLS L2VPN by respectively establishing connection from the SVP of the customer side to the DVP of the network side and connection from the SVP of the network side to the DVP of the customer side, which may refer to that: when the connection establishing module determines that the MPLS L2VPN accessed by the customer side and the network side through the virtual ports is a VPLS network, the VSI is established, the virtual ports of the customer side and the network side are associated with the VSI, and the customer side and the network side establish a data forwarding channel of the VPLS network by establishing connection from their respective SVPs to the DVPs of the opposite sides.

The access type of the message of the customer side, which is set by the control module, may be Port, or VLAN, or QinQ, or Port and VLAN, or Port and QinQ, or VLAN and QinQ; and the access type of the message of the network side, which is set by the control module, may be Label or Port.

The SVP set by the control module may be used for receiving the messages, and the DVP set by the control module may be used for sending the messages.

Compared with the existing technology, by uniformly mapping various access modes to virtual ports, accessing an MPLS L2VPN and carrying out the forwarding based on a VSI and the virtual ports, the disclosure enhances the extensibility of accessing the MPLS L2VPN by customer messages, reduces the management complexity of accessing the L2VPN and the difficulty in system development, and improves the system reliability.

DETAILED DESCRIPTION

The disclosure is further described below with reference to the accompanying drawings and embodiments.

The main idea of the disclosure is that: the customer side and the network side respectively make their messages access operator routing equipment, set access types of the messages to be mapped to virtual ports, and respectively allocate their respective Source Virtual Ports (SVPs) and Destination Virtual Ports (DVPs) to each access; the customer side and the network side establish a data forwarding channel of an MPLS L2VPN by establishing connection from their respective SVPs to the DVPs of the opposite sides.

Figure 1:
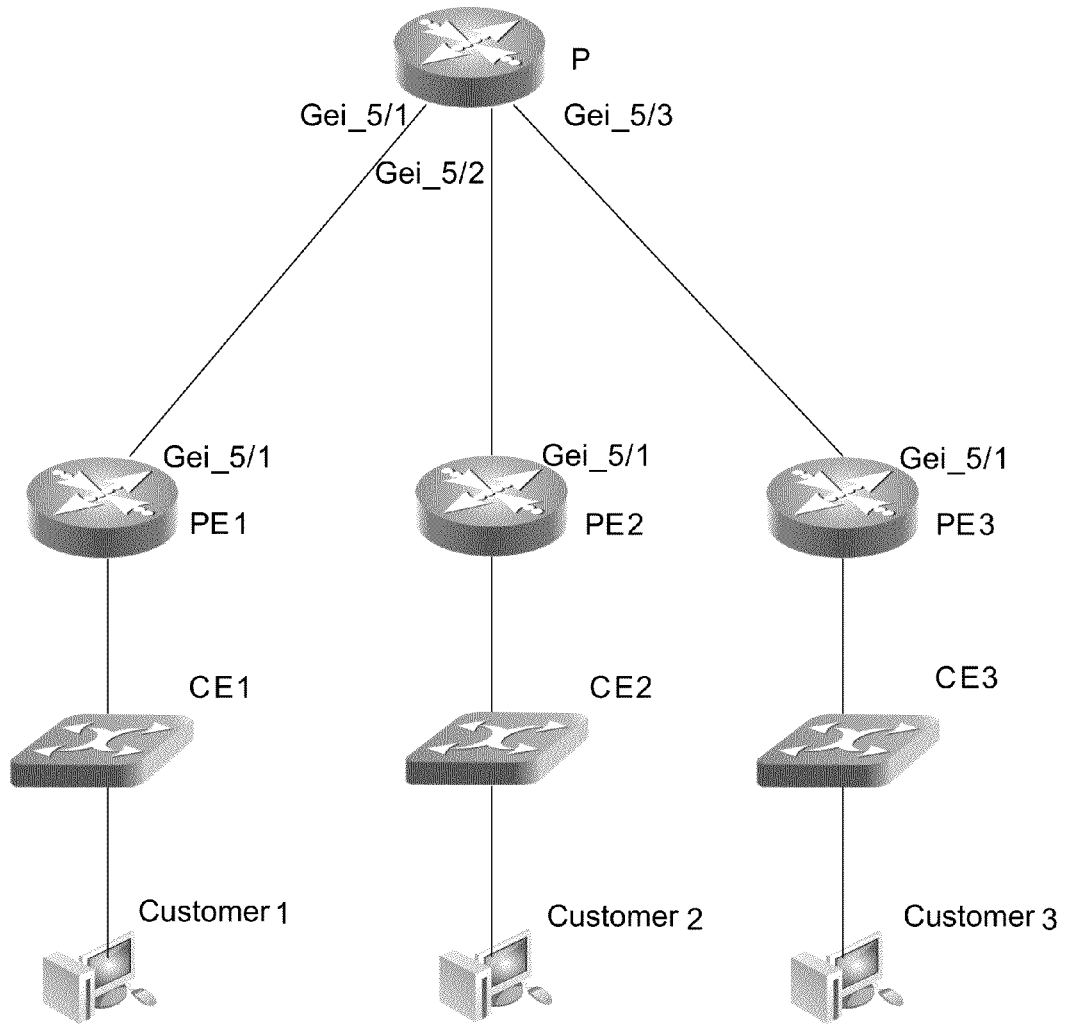
FIG. 1 shows a schematic diagram of customers accessing an MPLS L2VPN and the networking for the MPLS L2VPN in the existing technology.
Figure 2:
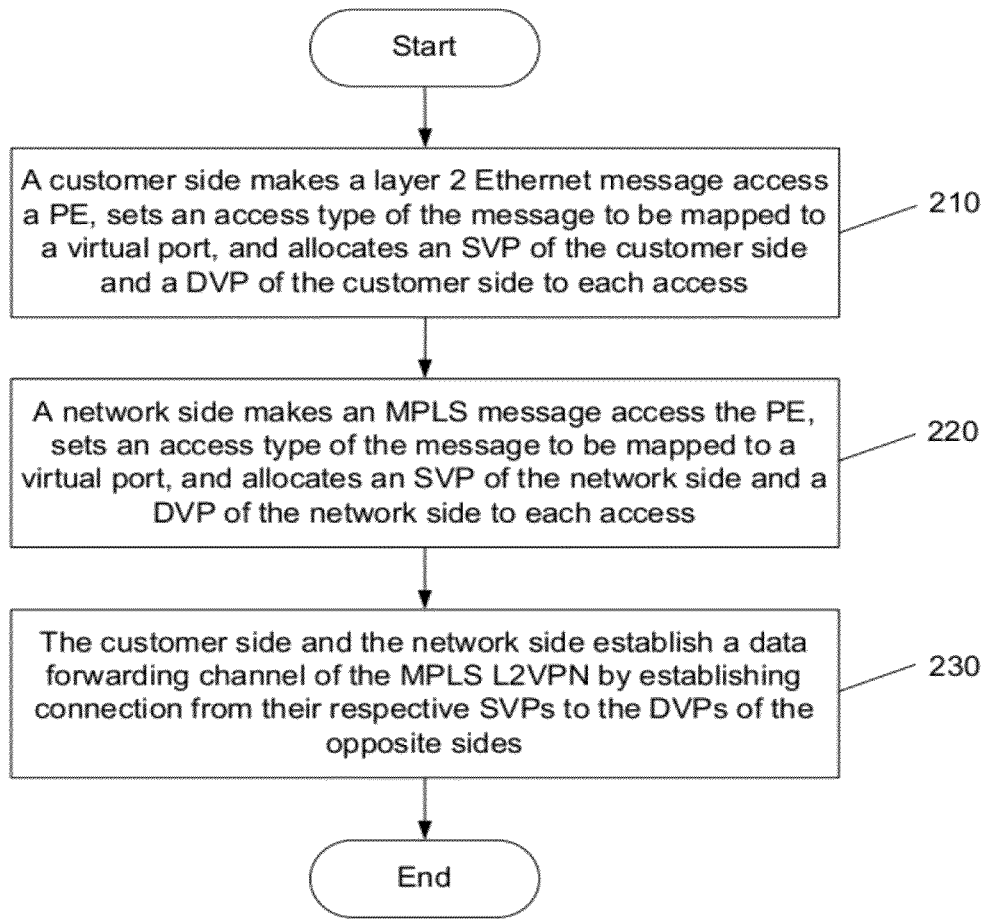
FIG. 2 shows a flowchart of accessing an MPLS L2VPN through virtual ports of the present disclosure.

As shown in FIG. 2, a flowchart of accessing the MPLS L2VPN through virtual ports of the present disclosure includes the following steps.

Step 210: the customer side makes a layer 2 Ethernet message access a PE, sets an access type of the message to be mapped to a virtual port, and allocates an SVP of the customer side and a DVP of the customer side to each access;

wherein the access type of the layer 2 Ethernet message of the customer side can be a Port, or a VLAN, or QinQ, or a Port and a VLAN, or a Port and QinQ, or a VLAN and QinQ;

wherein the SVP of the customer side is used for receiving the message, and the DVP of the customer side is used for sending the message.

Step 220: the network side makes an MPLS message access the PE, sets an access type of the message to be mapped to a virtual port, and allocates an SVP of the network side and a DVP of the network side to each access;

wherein the access type of the MPLS message of the network side can be a Label or a Port;

wherein the SVP of the network side is used for receiving the message, and the DVP of the network side is used for sending the message.

And Step 230: the customer side and the network side establish a data forwarding channel of the MPLS L2VPN by establishing connection from their respective SVPs to the DVPs of the opposite sides;

wherein when the customer side and the network side determine that the MPLS L2VPN accessed through the virtual ports is a VPWS network, the customer side and the network side establish a data forwarding channel of the VPWS network by establishing connection from their respective SVPs to the DVPs of the opposite sides;

when the customer side and the network side determine that the MPLS L2VPN accessed through the virtual ports is a Virtual Private LAN Service (VPLS) network, a VSI is established, the virtual ports of the customer side and the network side are associated with the VSI, and the customer side and the network side establish a data forwarding channel of the VPLS network by establishing connection from their respective SVPs to the DVPs of the opposite sides.

Figure 3:
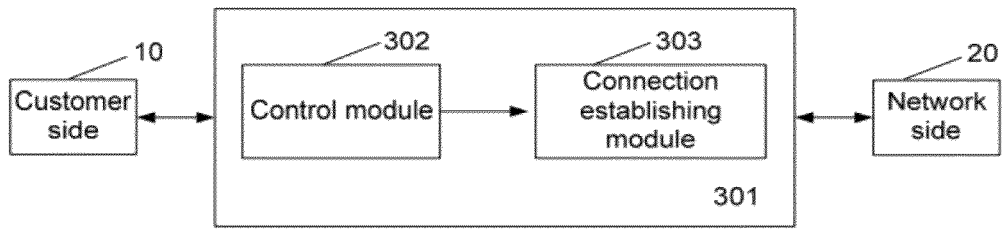
FIG. 3 shows a structure diagram of an access apparatus for an MPLS L2VPN of the present disclosure.

As shown in FIG. 3, an access apparatus 301 for an MPLS L2VPN includes a control module 302 and a connection establishing module 303, wherein the control module 302 is configured to respectively make a message of a customer side 10 and a message of a network side 20 access operator routing equipment, set access types of the messages to be mapped to virtual ports, respectively allocate respective SVPs and DVPs of the customer side and the network side to each access, and send information of the virtual ports after allocation to the connection establishing module 303;

the access type of the message of the customer side 10, which is set by the control module 302, is a Port, or a VLAN, or QinQ, or a Port and a VLAN, or a Port and QinQ, or a VLAN and QinQ;

the access type of the message of the network side 20, which is set by the control module 302, is a Label or a Port.

The SVP set by the control module 302 is used for receiving the messages, and the DVP set by the control module 302 is used for sending the messages.

The connection establishing module 303 is configured to establish a data forwarding channel of the MPLS L2VPN by respectively establishing connection from the SVP of the customer side 10 to the DVP of the network side and the connection from the SVP of the network side 20 to the DVP of the customer side, according to the information of the virtual ports after allocation which is sent by the control module 302.

The connection establishing module 303 establishing a data forwarding channel of the MPLS L2VPN by respectively establishing connection from the SVP of the customer side 10 to the DVP of the network side and the connection from the SVP of the network side 20 to the DVP of the customer side may specifically include:

when the connection establishing module 303 determines that the MPLS L2VPN accessed by the customer side 10 and the network side 20 through the virtual ports is a is VPWS network, the customer side 10 and the network side 20 establish a data forwarding channel of the VPWS network by establishing connection from their respective SVPs to the DVPs of the opposite sides.

The connection establishing module 303 establishing a data forwarding channel of the MPLS L2VPN by respectively establishing connection from the SVP of the customer side 10 to the DVP of the network side and the connection from the SVP of the network side 20 to the DVP of the customer side may specifically include:

when the connection establishing module 303 determines that the MPLS L2VPN accessed by the customer side 10 and the network side 20 through the virtual ports is a VPLS network, a VSI is established, the virtual ports of the customer side 10 and the network side 20 are associated with the VSI, and the customer side 10 and the network side 20 establish a data forwarding channel of the VPLS network by establishing connection from their respective SVPs to the DVPs of the opposite sides.

Accessing the VPWS network through the virtual ports in the present disclosure includes: making a layer 2 Ethernet message of the customer side access the network, and forwarding it to an output interface of the network side; ending an MPLS message of the network side, and forwarding it to an output interface of the customer side; and establishing a two-way forwarding channel.

Accessing the VPLS network through the virtual ports in the present disclosure includes: making a layer 2 Ethernet message of the customer side access the VSI, completing MAC address learning and lookup, and forwarding the layer 2 Ethernet message to an output interface of the network side; ending an MPLS message of the network side, making the MPLS message access the VSI, completing MAC address learning and lookup, and forwarding the MPLS message to an output interface of the customer side; and implementing horizontal partitioning of the VPLS on virtual ports.

The disclosure is further described below with reference to an example.

Figure 4:
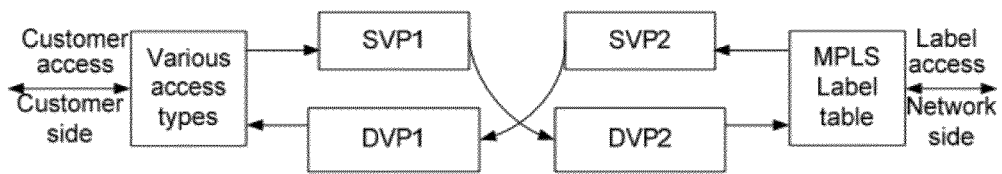
FIG. 4 shows a forwarding flowchart of accessing a VPWS network through virtual ports of the present disclosure.

As shown in FIG. 4, the step of accessing the VPWS network through virtual ports and carrying out the forwarding based on the virtual ports in the disclosure includes the following steps.

Step 1: a mapping relationship that a customer side accesses a virtual port and a mapping relationship that a network side accesses a virtual port are established;

first, a mapping relationship that a layer 2 Ethernet message of the customer side is accesses a virtual port is established; second, a mapping relationship that an MPLS label of the network side accesses a virtual port is established, and the virtual ports of the customer side and the network side are connected, that is, an SVP of the customer side points to a DVP of the network side, and an SVP of the network side points to a DVP of the customer side.

Step 2: a message from the customer side to the network side is processed; L2 information of the message is matched at the customer side, wherein the L2 information can be such information as a Port, a VLAN, QinQ, or the like; when a configuration item is matched, a corresponding SVP number is found according to the mapping relationship, and the SVP of the customer side points to the DVP of the network side, and the DVP of the network side points to an output interface of an MPLS tunnel, wherein the following information is included: an output port number, a source MAC address and a destination MAC address of an output interface, an output interface VLAN, a VC label and a tunnel label; and the message is forwarded from the network side after these pieces of information are encapsulated in the message.

And Step 3: a message from the network side to the customer side is processed; an MPLS input label of the message is matched at the network side; if it is a two-layer label, an outer tunnel label pops up, and a corresponding SVP of the network side is searched according to an inner VC label, and a corresponding DVP of the customer side is found according to the mapping relationship; the DVP points to the output interface of the customer side; after the outer tunnel label of the message is detached, an inner customer message is forwarded to the output interface of the customer side.

Figure 5:
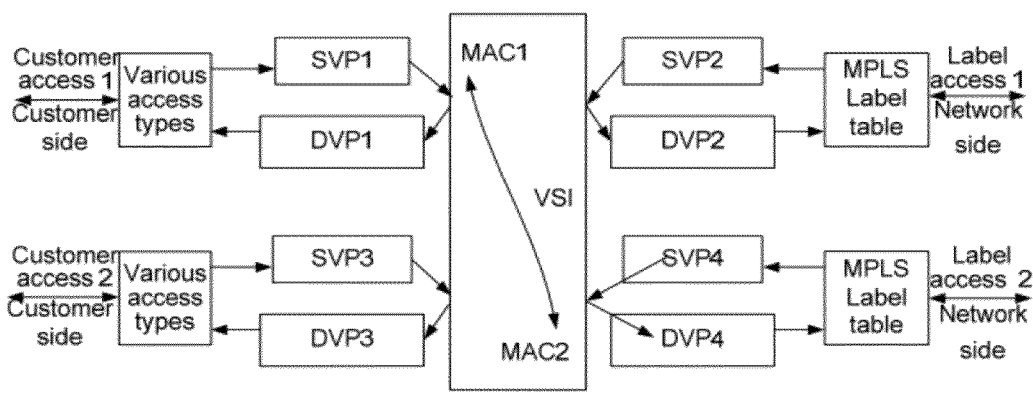
FIG. 5 shows a forwarding flowchart of accessing a VPLS network through virtual ports of the present disclosure.

As shown in FIG. 5, the step of accessing the VPLS network through virtual ports and performing the forwarding based on a VSI and the virtual ports in the disclosure includes the following steps:

Step 1: a VSI is established;

Step 2: a customer side and a network side access the VSI; the customer side establishes a mapping relationship that a layer 2 Ethernet message accesses a virtual port, and enables the virtual port to point to the VSI; and the network side establishes a mapping relationship from a VC input label to a virtual port, and enables the virtual port to point to the VSI;

Step 3: a broadcast group is established in the VSI; members of the group include all the virtual ports of the customer side and the network side;

Step 4: a message from the customer side to the network side is processed; matching L2 information of the message is performed at the customer side, wherein the L2 information can be such information as Port, VLAN, QinQ, or the like; after a configuration item is matched, a corresponding virtual port number is found according to the mapping relationship, and an SVP of the customer side points to the VSI; and then a source MAC address of the message learns the corresponding VSI and a corresponding virtual port of the customer side; an output interface is searched according to the VSI and a destination MAC address; if the output interface cannot be found, then broadcasting is performed in the broadcast group to which the VSI corresponds, otherwise, the message is forwarded to the virtual port to which destination MAC address corresponds; if the virtual port is a virtual port of the network side, the message is forwarded to an output interface of an MPLS tunnel, wherein the following information is included: an output port number, a source MAC address and a destination MAC address of an output interface, an output interface VLAN, a VC label and a tunnel label; and the message is forwarded from the network side after these pieces of information are encapsulated in the message; and Step 5: a message from the network side to the customer side is processed; an MPLS input label of the message is matched at the network side; if it is a two-layer label, an outer tunnel label pops up, and a corresponding virtual port of the network side is searched according to an inner VC label, at this time, the virtual port points to the VSI; and then a source MAC address of the message learns the corresponding VSI and the corresponding virtual port of the network side; an output interface is searched according to the VSI and a destination MAC address; if the output interface cannot be found, then broadcasting is performed in a broadcast group to which the VSI corresponds, otherwise, the message is forwarded to the virtual port to which the destination MAC address corresponds; if the virtual port is a virtual port of the customer side, an inner customer message is forwarded to the output interface of the customer side after outer tunnel information of the message is detached.

The above are only the preferred embodiments of the disclosure, and not intended to limit the scope of the disclosure; any modifications or replacements that the persons skilled in the art can easily think about in the scope of technology disclosed by the disclosure should fall within the scope of the disclosure. Thus, the scope of the disclosure should be subject to the scope of the claims of the disclosure.

What is claimed is:

1. An access method for a Multi-protocol Label Switching Layer 2 Virtual Private Network (MPLS L2VPN), comprising:
    making, by a customer side and a network side, their respective messages access operator routing equipment, setting access types of the messages to be mapped to virtual ports, and respectively allocating their respective Source Virtual Ports (SVP) and Destination Virtual Ports (DVP) to each access; and
    establishing, by the customer side and the network side, a data forwarding channel of the MPLS L2VPN by establishing connection from their respective SVPs to DVPs of opposite sides.

2. The access method according to claim 1, wherein the establishing, by the customer side and the network side, a data forwarding channel of the MPLS L2VPN by establishing connection from their respective SVPs to DVPs of opposite sides comprises:
    when the customer side and the network side determine that the MPLS L2VPN accessed through the virtual ports is a Virtual Private Wire Service (VPWS) network, establishing, by the customer side and the network side, a data forwarding channel of the VPWS network by establishing connection from their respective SVPs to the DVPs of the opposite sides.

3. The access method according to claim 2, wherein the SVP is used for receiving the messages, and the DVP is used for sending the messages.

4. The access method according to claim 1, wherein the establishing, by the customer side and the network side, a data forwarding channel of the MPLS L2VPN by establishing connection from their respective SVPs to DVPs of opposite sides comprises:
    when the customer side and the network side determine that the MPLS L2VPN accessed through the virtual ports is a Virtual Private LAN Service (VPLS) network, establishing a Virtual Switch Interface (VSI), associating the virtual ports of the customer side and the network side with the VSI, and establishing, by the customer side and the network side, a data forwarding channel of the VPLS network by establishing connection from their respective SVPs to the DVPs of the opposite sides.

5. The access method according to claim 4, wherein
    the SVP is used for receiving the messages, and the DVP is used for sending the messages.

6. The access method according to claim 1, wherein
    the access type of the message of the customer side is Port, or Virtual Local Area Network (VLAN), or QinQ, or Port and VLAN, or Port and QinQ, or VLAN and QinQ; and
    the access type of the message of the network side is Label or Port.

7. The access method according to claim 6, wherein
    the SVP is used for receiving the messages, and the DVP is used for sending the messages.

8. The access method according to claim 1, wherein
    the SVP is used for receiving the messages, and the DVP is used for sending the messages.

9. An access apparatus for a Multi-protocol Label Switching Layer 2 Virtual Private Network (MPLS L2VPN), comprising a control module and a connection establishing module, wherein
    the control module is configured to respectively make a message of a customer side and a message of a network side access operator routing equipment, set access types of the messages to be mapped to virtual ports, allocate respective Source Virtual Ports (SVP) and Destination Virtual Ports (DVP) of the customer side and the network side to each access, and send information of the virtual ports after allocation to the connection establishing module; and
    the connection establishing module is configured to establish a data forwarding channel of the MPLS L2VPN by respectively establishing connection from the SVP of the customer side to the DVP of the network side and connection from the SVP of the network side to the DVP of the customer side, according to the information of the virtual ports after allocation which is sent by the control module.

10. The access apparatus according to claim 9, wherein the connection establishing module is configured to establish a data forwarding channel of the MPLS L2VPN by respectively establishing connection from the SVP of the customer side to the DVP of the network side and connection from the SVP of the network side to the DVP of the customer side, which refers to that:
    when the connection establishing module determines that the MPLS L2VPN accessed by the customer side and the network side through the virtual ports is a Virtual Private Wire Service (VPWS) network, the customer side and the network side establish a data forwarding channel of the VPWS network by establishing connection from their respective SVPs to the DVPs of opposite sides.

11. The access apparatus according to claim 10, wherein
    the SVP set by the control module is used for receiving the messages, and the DVP set by the control module is used for sending the messages.

12. The access apparatus according to claim 9, wherein the connection establishing module is configured to establish a data forwarding channel of the MPLS L2VPN by respectively establishing connection from the SVP of the customer side to the DVP of the network side and connection from the SVP of the network side to the DVP of the customer side, which refers to that:
    when the connection establishing module determines that the MPLS L2VPN accessed by the customer side and the network side through the virtual ports is a Virtual Private LAN Service (VPLS) network, a Virtual Switch Interface (VSI) is established, the virtual ports of the customer side and the network side are associated with the VSI, and the customer side and the network side establish a data forwarding channel of the VPLS network by establishing connection from their respective SVPs to the DVPs of opposite sides.

13. The access apparatus according to claim 12, wherein the SVP set by the control module is used for receiving the messages, and the DVP set by the control module is used for sending the messages.

14. The access apparatus according to claim 9, wherein the access type of the message of the customer side, which is set by the control is module, is Port, or VLAN, or QinQ, or Port and VLAN, or Port and QinQ, or VLAN and QinQ; and the access type of the message of the network side, which is set by the control module, is Label or Port.

15. The access apparatus according to claim 14, wherein the SVP set by the control module is used for receiving the messages, and the DVP set by the control module is used for sending the messages.

16. The access apparatus according to claim 9, wherein the SVP set by the control module is used for receiving the messages, and the DVP set by the control module is used for sending the messages.

* * * * *